Jan. 30, 1951     R. F. SICKLES     2,539,526

INSULATION REMOVAL APPARATUS

Filed May 29, 1948     2 Sheets-Sheet 1

INVENTOR
ROYAL F. SICKLES
BY Jammond Franklin
ATTORNEYS

Jan. 30, 1951 R. F. SICKLES 2,539,526
INSULATION REMOVAL APPARATUS
Filed May 29, 1948 2 Sheets-Sheet 2
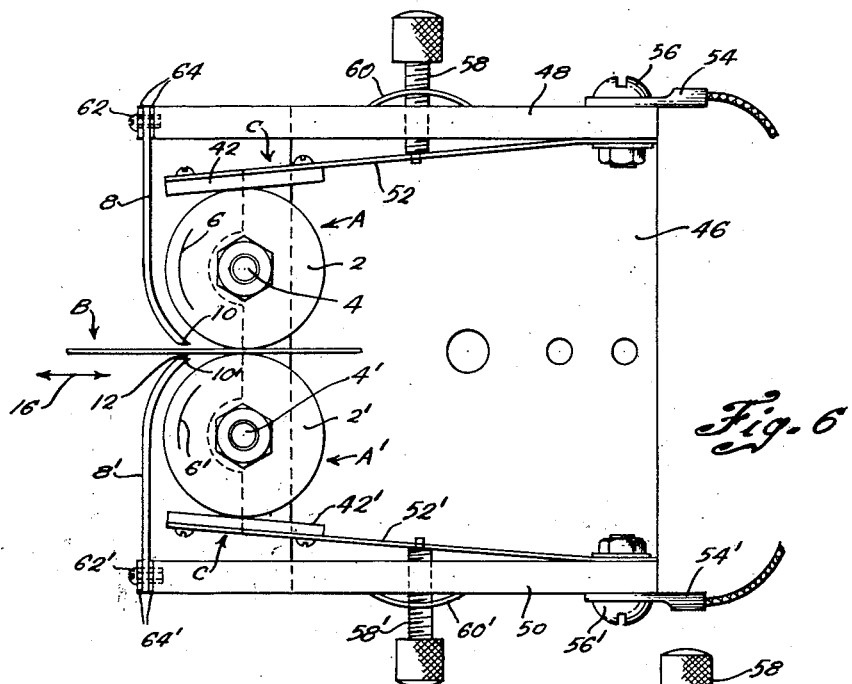
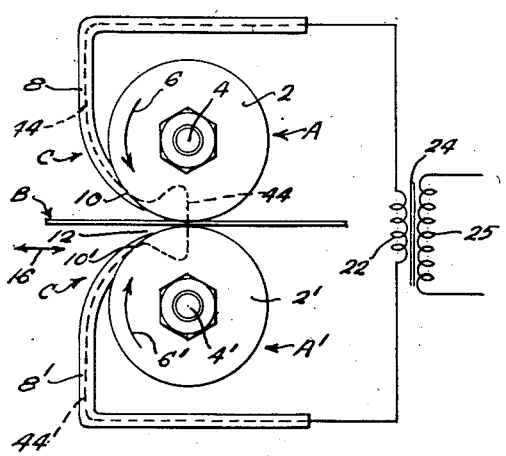
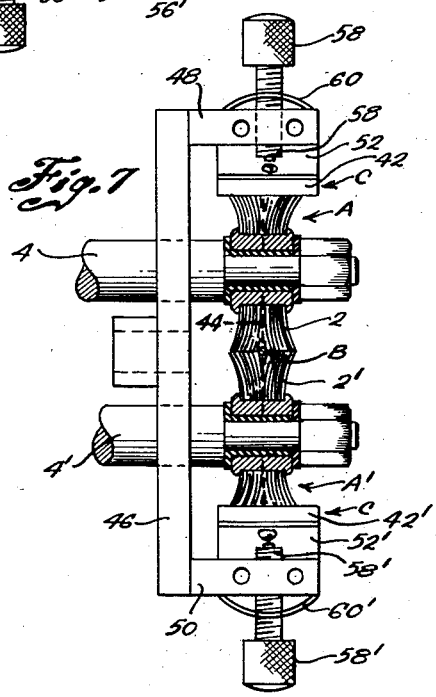
INVENTOR
ROYAL F. SICKLES
BY James and Franklin
ATTORNEYS.

Patented Jan. 30, 1951

2,539,526

UNITED STATES PATENT OFFICE 2,539,526

INSULATION REMOVAL APPARATUS

Royal F. Sickles, Springfield, Mass., assignor to
The F. W. Sickles Company, Chicopee, Mass.,
a corporation of Massachusetts Application May 29, 1948, Serial No. 30,043

20 Claims. (Cl. 219—19)

The present invention relates to an improved apparatus for removing retentive thermoplastic insulation from wires and is particularly adapted for use with fine wires coated with a plastic insulated coating such as the polyvinyl acetal resin film sold by General Electric Company under the trade name "Formex."

Removal of insulation from wires, and particularly the removal of insulation from very fine wires, has always presented a very definite problem to the electrical industry, particularly in cases where, in order to facilitate production, the insulation must be removed rapidly and efficiently. The problems involved in insulation removal are magnified many-fold when relatively fine wire is involved, such wire often being only .001 of an inch in diameter. The most common method for removing insulation from such wire in the past has been to insert the portion of the wire from which the insulation is to be stripped between a pair of rapidly rotating wire brushes, the brushes scraping the insulation from the wire.

A greatly improved type of insulation has made its appearance on the commercial market in the past few years, this insulation comprising a thin sheet of polyvinyl acetal synthetic resin. The insulation is strong, flexible, abrasion resistant, light and thin, and is possessed of excellent electrical characteristics. However, with these advantages comes the disadvantage that it is very well adhered to the wire which it coats, so that removal thereof from the wire is an exceedingly difficult task.

The wire brushes which served in the past as agents for efficient and satisfactory insulation removal are almost completely ineffective against insulation of this type. If the wire bristles of the brushes be exceedingly sharp, such insulation will be removed by them but the brushes dull quickly in use and constant redressing of the brushes is therefore rendered necessary. From a production point of view, this is inadmissible since the time lost in replacing brushes and in redressing them becomes an exceedingly important factor in computing production costs. Moreover, when brushes of the requisite sharpness are employed, it is a matter of great difficulty, involving considerable skill, to employ them to clean fine wire, since their sharpness will be such as not only to strip the insulation but also to score and even break the wire strands themselves. When it is considered that a great proportion of the coils and other electrical equipment used today in communication equipment, for example, are formed of Litz wire, which is a thin cable formed of a multiplicity of even thinner wires, it will be apparent that breakage of the fine wire strands employed cannot be tolerated. If a ten strand Litz be cleaned with sharp brushes, and if only one of those strands be broken by the brushes, 10% of the value of the coil will be lost, since $\frac{1}{10}$ of the effective conductors in the coil will not be connected in the circuit.

In order to avoid these disadvantages, various expedients have been resorted to, all of which present considerable difficulty and many disadvantages. It has been proposed to burn the insulation, as by placing the wire in a flame, after which the wire is subjected to a mild brushing action to remove the burned insulation. This method proves fairly satisfactory for relatively thick wires, but is wholly inapplicable to thin wires since the flame will either melt the wire itself, causing it to break, or will so heat treat the wire as to embrittle it and thus prevent its subsequent manipulation for connection in the electrical circuit.

It has also been proposed to dip the wires to be stripped of insulation into various organic and inorganic reagents, the dipping serving the purpose either of completely removing the insulation or of softening it so that a subsequent brushing operation will remove it. These dipping methods not only require the employment of relatively expensive reagents and present a definite safety hazard because of the noxious or harmful nature of the reagents, but also are extremely time consuming. The assignee of this application has in the past employed one of the dipping methods most popular in the industry today and has found that, even when skilled operators are employed, approximately 20 seconds are taken up for the cleaning of the ends of the wire forming a single inductance coil. By way of comparison, the present invention gives rise to cleaner stripping in less than one-fifth of the time.

It is the prime object of the present invention to provide an apparatus for stripping retentive thermoplastic insulation from wires which avoids the disadvantages set forth above and which is capable of use with the finest wires without damaging them.

In particular, the apparatus is simple in construction, extremely rapid and positive in operation, dependable, safe and inexpensive to operate.

Another object of the present invention is to devise an apparatus of the type described which employs rotating wire brushes for removing the insulation, the apparatus being so constructed that the sharpness of the brushes is not critical and indeed in which dull brushes are superior to sharp brushes particularly when fine wire is to be stripped.

A further object of the present invention is to devise an apparatus in which abrading elements such as brushes are applied to the wire so as to strip the insulation therefrom, the abrading elements themselves being heated so that the thermoplastic insulation is simultaneously softened by the heat and stripped from the wire by the action of the abrading elements.

A more specific object of the present invention is to provide such an apparatus in which the abrading elements are in the form of conductive wire brushes normally in contact one with the other and in which the brushes are heated by the passage of an electrical current therethrough.

Yet another object of the present invention resides in the specific apparatus employed for causing the electrical current to pass through the wire brushes and for guiding the wire ends between the brushes in proper alignment therewith.

To the accomplishment of the foregoing objects and such other objects as may hereinafter appear, the present invention relates to the construction of an apparatus for removing retentive thermoplastic insulation from wires as defined in the appended claims and as described in this specification, taken together with the accompanying drawings, in which:

Fig. 6 is a view similar to Fig. 3 but in which electric current is applied to the brushes at their periphery and not at a slip ring;

Fig. 7 is a side view of Fig. 6; and

Fig. 8 is an alternative embodiment of the apparatus of the present invention in which the guards for guiding the wire between the brushes themselves make electrical connection with the periphery of the brushes.

Figure 1:
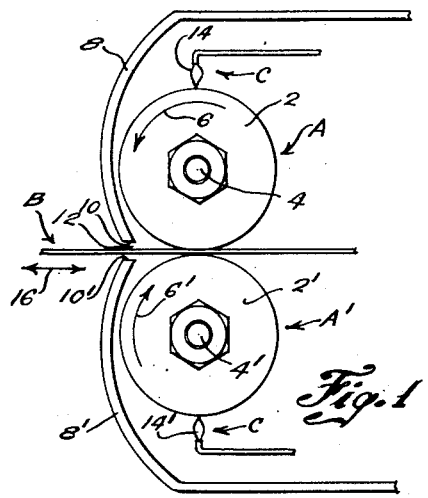
Fig. 1 is a side schematic view of one embodiment of the present invention, the brushes being heated by means of gas flames.

Viewed in its broadest aspects, my invention comprises the use of a pair of relatively movable abrasive elements generally designated A and A' between which a wire generally designated B is adapted to be passed and by which the insulation on the wire is adapted to be physically removed. One or more heating elements generally designated C are active on the abrasive elements A and A' to heat the same to a temperature such that when the thermoplastic insulation on the wire B is brought into contact with the abrasive elements A, that insulation will be softened sufficiently so that the abrasive elements A will strip it from the wires easily and without the exercise of excessive force.

It is of prime importance that the heating of the insulation and the abrasive action take place simultaneously, particularly when fine wires are involved, since the surface area of the insulation in such wires is so related to their mass that they lose their heat exceedingly quickly. Hence, any attempt first to heat the insulation and then to move it to a position between the abrasive elements A has been found to be completely ineffectual. Indeed, it has even been discovered that if the abrasive elements A and A' are first brought to proper temperature so that they act efficiently to strip insulation from the wires B and the heating elements C therefore are then deenergized, the abrasive elements A and A' very quickly drop in temperature so that they are no longer effective to remove insulation. The temperature to which the abrasive elements A and A' are raised is sufficient to soften the insulation on the wires B yet insufficient to deleteriously affect the wires B themselves. The exact value of this temperature is thought to be in the neighborhood of between 300° and 400° F. when Formex-coated wire is to be stripped, but this represents an estimate only, applicant having been unable accurately to measure the temperature of the abrading elements A and A' while they were in motion. However, this temperature will vary depending upon the type of insulation with which the apparatus is used and consequently the exact value is of no significance. The action of the heating elements C may be controlled empirically until abrasive elements A and A' have been brought to a temperature such that, by trial and error demonstration, they efficiently remove the insulation from the wire in question without injuring the wire.

As here specifically disclosed, the abrasive elements A and A' are in the form of brushes 2 and 2' the bristles 26 of which are defined by fine conductive metal strands or wires. This type of brush has long been known in the past and is commercially available. The brushes 2 and 2' are mounted upon shafts 4 and 4' and are rotated thereby in opposite directions as indicated by the arrows 6 and 6', the brushes being positioned so that they are normally in peripheral contact one with the other. The specific apparatus for mounting and rotating the brushes forms no part of the present invention and is well known in the art. Consequently, the details thereof have not been illustrated here, it being understood that the shafts 4 and 4' are connected in any appropriate manner to a motor so that they may be driven at high speeds as above described.

The brushes are covered, at least on the side thereof through which the wire B is to be inserted, by a pair of guards 8, 8', the ends of the guards terminating in spaced tips 10, 10' defining between them a gap 12 aligned with the point of peripheral contact between the brushes 2 and 2' and through which the wire B is adapted to be passed, the gap 12 thus serving as a wire insertion guide opening.

In order that the brushes 2 and 2' be rendered capable of removing very retentive insulation from the wire B, it is necessary that they be heated by the heating elements C to a temperature sufficient to soften the insulation on the wire B. In Fig. 1, the heating elements C take the form of gas burners 14, 14' which are active on the periphery of the brushes 2 and 2' to heat the same as they rotate. The size of the flame on the burners 14, 14' may be regulated until the brushes 2 and 2' reach and maintain the proper temperature. The flame may be applied to the hub of the brush, if desired, in order to avoid carbonization of the bristles 26. Because of the fact that the brushes are being very rapidly rotated, they tend to cool very quickly, probably due to windage effects, and consequently heat from the burners 14 and 14' must be constantly applied if the brushes 2 and 2' are to perform their function.

Once the brushes 2 and 2' have been brought to the proper temperature, the wire B is inserted through the guide opening 12 between the brushes 2 and 2' and is then moved back and forth in the direction of the arrow 16 until the insulation has been completely stripped therefrom. The length of wire from which the insulation is stripped is determined by the degree to which the wire is inserted into the apparatus and is completely within the control of the operator at all times.

Figure 2:
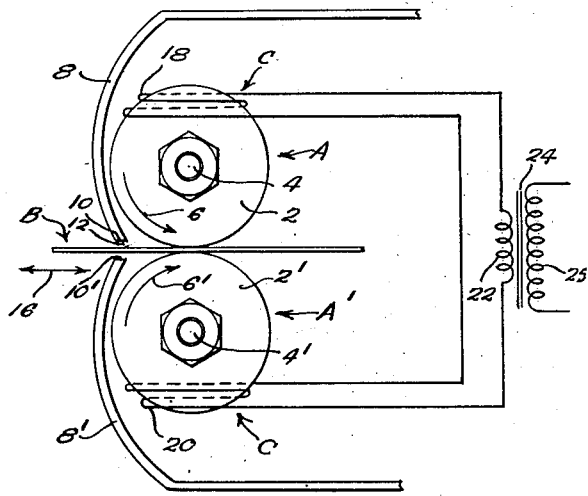
Fig. 2 is a view similar to Fig. 1, but in which inductive heating of the brushes is employed.

In Fig. 2, another embodiment of the invention is illustrated in which the brushes 2 and 2' are heated inductively by means of coils 18 and 20 connected in series to the secondary 22 of a transformer 24 the primary 25 of which is connected to any suitable source of alternating current. In this embodiment, the bristles 26 of the brushes 2 and 2' must be conductive and the coils 18 and 20 are so positioned that the bristles 26 pass through the coils 18 and 20 as the brushes 2 and 2' rotate. Hence, the brushes 2 and 2' are evenly heated during operation.

Figure 3:
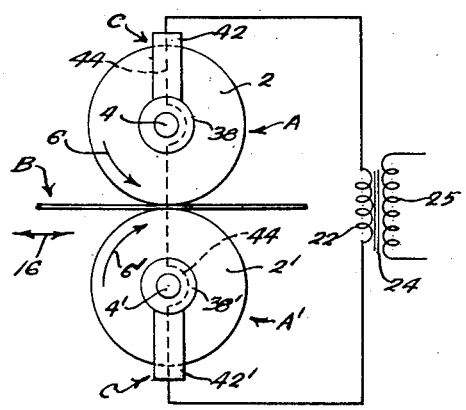
Fig. 3 is a view similar to Fig. 1 in which current is passed directly through the brushes for heating the same.
Figure 4:
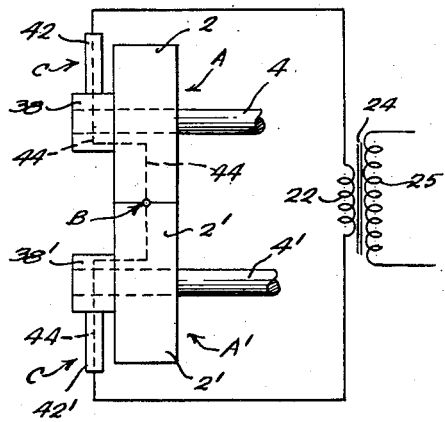
Fig. 4 is a side view of Fig. 3.
Figure 5:
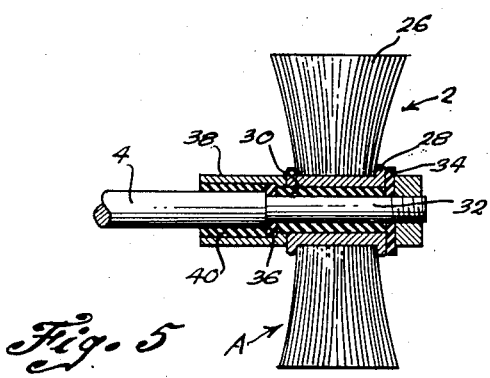
Fig. 5 is a view on an enlarged scale of the brush assembly used in the embodiment of Figs. 3 and 4.

The embodiment of Figs. 3, 4 and 5 disclose a modification in which the brushes 2 and 2' are heated by the direct passage of electricity therethrough. To this end, as shown in Fig. 5, the brush 2 (brush 2' is identical in construction), which comprises the wire bristles 26 retentively set in a conductive spool 28, is insulated from the shaft 4 with which it rotates by an insulating spacer 30 positioned between the spool 28 and the reduced portion 32 of the shaft 4 which passes through the spool 28, by an insulating washer 34 at the outer end of the spool 28 and another insulating washer 36 between the inner end of the spacer 30 and the outer end of the larger diameter portion of the shaft 4. Electrical connection to the bristles 26 is achieved by a conductive slip ring 38 mounted on the shaft 4 and in physical contact with the spool 28, the slip ring 38 being spaced and insulated from the shaft 4 by means of spacer 40. The slip ring 38 is in physical and electrical connection with the brush 2 and rotates therewith. The secondary 22 of the transformer 24 is electrically connected to the slip rings 38, 38' by means of stationary contactors 42, 42' suitably mounted on the apparatus and bearing against the slip rings 38. These contactors 42, 42' are commonly termed "brushes" in electrical parlance, but in view of the fact that the abrasive elements A are also termed brushes, the "electrical brushes" denominated by the numerals 42 and 42' will hereinafter be termed "contactors" in order to avoid confusion.

As a result of the circuit arrangement thus described, the electrical current output from the transformer 24 will take the path illustrated by the broken line 44. The circuit is complete because the brushes 2 and 2' are always in contact with one another. For this application it is preferred that the brush bristles 26 be formed of some high resistive material such as iron so that they will heat more readily upon the passage of current therethrough.

With this modification, in which the electrical current is passed directly through the brushes 2 and 2' and from the brush 2 to the brush 2' at the point of contact between the brushes, a number of improved effects result. In the first place, as will be apparent from Fig. 4, at least some of the current passing between the brushes 2 and 2' will, as soon as some insulation has been stripped from the wire B, pass directly through the wire B itself, from the top thereof to the bottom. This will cause some heating of the wire B and thus will aid in softening the insulating layer thereon. It will be noted, however, that the current does not pass through the length of the wire and consequently the wire will offer only a very small over-all resistance to the passage of current so that the heating of the wire is kept within bounds and even the finest wire is not heated to a degree sufficient to damage it.

It has previously been stated that, particularly when fine wire is to be operated upon, it is desirable that the bristles 26 have dull tips in order that the wire strands themselves not be damaged. When electricity is passed directly through the bristles themselves, a convenient means for ensuring that the bristle tips are dull is presented. It has been found that if the brushes 2 and 2' are rotated and if current be passed through the brushes 2 and 2', the heat engendered in the bristles 26 will soften those bristles sufficiently so that the friction of bristle upon bristle as the brushes 2 and 2' rotate will round off or dull the bristle tips. In order to facilitate this, it has been found that if the brushes be separated slightly, the arcing which will take place between the bristle tips will have a very beneficial effect.

Figs. 6 and 7 illustrate yet another embodiment in which current is passed directly through the brushes 2 and 2', but here the use of slip rings 38, 38' is dispensed with. The brushes 2 and 2' are insulatedly mounted on their shafts 4 and 4' and the contactors 42 and 42' directly engage the periphery of the brushes. As illustrated in Figs. 6 and 7, a side plate 46 bears top and bottom plates 48 and 50 respectively. The contactors 42 and 42' are each secured to resilient conductive strips 52 and 52', the other ends of the strips being fastened to the top and bottom plates 48 and 50 respectively. The thus secured ends of the strips 52 and 52' are electrically connected to the transformer 24 as by means of connector lugs 54, 54' and screws 56, 56' passing through the top and bottom plates 48 and 50. Also passable through the top and bottom plates 48 and 50 are tension controlling elements 58 and 58', here shown in the form of screws threadable through tension nuts 60, 60' and bearable against the resilient strips 52, 52' so as to control and vary the force of engagement between the contactors 42, 42' and the brushes 2 and 2'. Manipulation of the tension controlling elements 58, 58' provide an efficient means for compensating for wear of the contactors 42, 42' and of the brushes 2 and 2' and for controlling with precision the current which passes through the brushes 2 and 2' to heat the same.

The guards 8 and 8' are fastened to the ends of the top and bottom plates 48 and 50 by means of screws 62, 62'. It has been found desirable that the guards 8, 8' be insulated from the electrical circuit of which the brushes 2 and 2' are a part. If they are not so insulated, when a wire is inserted through the guide opening 12, and particularly when the wire is a fine one or is composed of fine strands, if the wire should touch one of the guards 8 or 8' while another portion of the wire is in contact with the brushes 2 and 2', an arc will form and current will flow from, for example, the guard 8 through the wire B to the brush 2', thus shorting the brush 2 out of the circuit. Not only will this cause a break in the insulation, but it also causes overheating of the wire and fine wires often break at the point of arcing. The insulation of the guards 8, 8' from the circuit can be accomplished either by forming the top and bottom plates 48 and 50 of insulating material or by interposing insulating washers 64, 64' on either side of the guards 8 and 8' where they are fastened to the top and bottom plates 48 and 50.

Fig. 8 represents a modification of the present invention which may be useable where the arcing effect just described has no significant effects. In Fig. 8, the guards 8 and 8' themselves form part of the electrical circuit, being electrically connected to the transformer 24, the tips 10 and 10' of the guards 8 and 8' themselves making contact with the periphery of the brushes 2 and 2'. Hence, the guards 8 and 8' not only function to guide the wire B between the brushes 2 and 2', but also take the place of the contactors 42 and 42'. By reason of the fact that the guards 8 and 8' engage the brushes 2 and 2' at a point closely adjacent to the point of contact between the brushes 2 and 2', this being contrasted to the embodiment of Fig. 6 in which the contactors 42, 42' engage the brushes 2 and 2' diametrically opposite to the point of contact between the brushes, it will be apparent that the current path as illustrated by the broken line 44 is considerably shorter and the bristles 26 are heated by the passage of current therethrough immediately before they engage the insulation on the wire B. This makes for a somewhat more efficient apparatus since the bristles 26 do not have a chance to cool between the time that they are heated and the time that they make contact with the insulation on the wire, as is the case in the embodiment of Fig. 6.

By employing the apparatus of the present invention I have been able to strip Formex insulation from the finest of wires and from Litz wire in substantially the same period of time as was required to strip conventional insulation by means of wire brushes, yet unheated wire brushes were totally unable to remove Formex insulation no matter for how long they were permitted to act upon the coated wire. The passage of electrical current through the brushes, which provides a very convenient and efficient way of heating the brushes and which also aids in removing insulation because some of the current passes transversely through the wire so as to heat the same somewhat, has been found not to be absolutely essential to the operation of the apparatus. Thus, in one demonstration, electrical current was employed to bring the brushes up to proper heat and the current was then cut off, after which the wire was immediately inserted between the brushes. The Formex insulation on the wire was effectively stripped. However, it was found that the brushes would strip the insulation effectively only for a matter of a few seconds after the current was cut off, thus indicating that the temperature to which the brushes are heated is critical and that rapidly rotating brushes tend to cool very quickly.

The apparatus of the present invention requires no special skill to operate, calls for the purchase and consumption of no expensive reagents, and utilizes only slightly more electric power than does a conventional wire brush. Rate of production is maintained when my invention is employed and at the same time the percentage of rejects, caused by improper insulation stripping or by breaking of wire strands, is materially reduced. The condition of the brushes is not of critical importance and indeed, as the apparatus is employed, the self-dulling action of bristles on one another improves rather than detracts from the efficient operation of the apparatus.

The transformer 24 is designed to supply a current of high amperage and low voltage to the brushes for the efficient heating thereof. This transformer may be self-regulating so that a constant current is supplied but that is by no means necessary. It will also be understood that any other source of electrical current could be employed for heating purposes.

It will also be understood that, although my invention has been described specifically for wire coated with a polyvinyl acetal type insulating resin, it will be equally effective in removing other retentive insulating coatings such as enamel, particularly when very fine wires are employed, provided that the insulating coating will soften when heated. It will also be apparent that many variations may be made in the specific design of my apparatus all within the spirit of the invention as defined in the following claims.

I claim:

1. Apparatus for removing retentive thermoplastic insulation from wires comprising a pair of rotatable abrasive brushes between which the wire is adapted to be passed and by which the insulation is adapted to be physically removed, and heating elements for said abrasive brushes effective to raise the temperature of said abrasive brushes sufficiently to soften the insulation on the wire.

2. Apparatus for removing retentive thermoplastic insulation from wires comprising a pair of rotatable wire brushes in contact one with the other between which the wire is adapted to be passed and by which the insulation is adapted to be physically removed, and a pair of contactors electrically connected to opposite sides of a source of electricity and each connected to one of said brushes for passing current through and between said brushes, thereby raising their temperature sufficiently to soften the insulation on the wire.

3. Apparatus for removing retentive thermoplastic insulation from wires comprising a pair of rotatable wire brushes in contact one with the other between which the wire is adapted to be passed and by which the insulation is adapted to be physically removed, said brushes being insulated from the shafts on which they are mounted, and contactors electrically connected to said brushes and to a source of electricity for passing current through said brushes, thereby raising their temperature sufficiently to soften the insulation on the wire.

4. Apparatus for removing retentive thermoplastic insulation from wires comprising a pair of rotatable wire brushes in contact one with the other between which the wire is adapted to be passed and by which the insulation is adapted to be physically removed, said brushes being insulated from the shafts on which they are mounted, slip rings on said shafts insulated therefrom and electrically connected to said brushes, and contactors electrically connected to a source of electricity and bearable against said slip rings, thereby passing current through said brushes and raising their temperature sufficiently to soften the insulation on the wire.

5. Apparatus for removing retentive thermoplastic insulation from wires comprising a pair of rotatable wire brushes in contact one with the other between which the wire is adapted to be passed and by which the insulation is adapted to be physically removed, and contactors electrically connected to a source of electricity and bearable against the periphery of said brushes, thereby passing current through said brushes and raising their temperature sufficiently to soften the insulation on the wire.

6. Apparatus for removing retentive thermoplastic insulation from wires comprising a pair of rotatable wire brushes in contact one with the other between which the wire is adapted to be passed and by which the insulation is adapted to be physically removed, and contactors electrically connected to a source of electricity and bearable against the periphery of said brushes at a point approximately diametrically disposed from the point of contact of said brushes one with the other, thereby passing current through said brushes and raising their temperature sufficiently to soften the insulation on the wire.

7. Apparatus for removing retentive thermoplastic insulation from wires comprising a pair of rotatable wire brushes in contact one with the other between which the wire is adapted to be passed and by which the insulation is adapted to be physically removed, and contactors electrically connected to a source of electricity and bearable against the periphery of said brushes at a point adjacent to the point of contact of said brushes one with the other, thereby passing current through said brushes and raising their temperature sufficiently to soften the insulation on the wire.

8. Apparatus for removing retentive thermoplastic insulation from wires comprising a pair of rotatable wire brushes in contact one with the other between which the wire is adapted to be passed and by which the insulation is adapted to be physically removed, and a pair of guards covering a portion of the periphery of said brushes on the wire insertion side of said apparatus, the tips of said guards being spaced from one another in line with a point of contact between said brushes so as to define a wire insertion guide opening, said guards being electrically connected to a source of electricity and portions thereof being bearable against the periphery of said brushes, thereby passing current through said brushes and raising their temperature sufficiently to soften the insulation on the wire.

9. Apparatus for removing retentive thermoplastic insulation from wires comprising a pair of rotatable wire brushes in contact one with the other between which the wire is adapted to be passed and by which the insulation is adapted to be physically removed, contactors electrically connected to a source of electricity and bearable against the periphery of said brushes, resilient members to which said contactors are fastened, a frame to which said resilient members are secured, and tension controlling elements on said frame active on said resilient members to vary the force of engagement between said contactors and said brushes.

10. The apparatus of claim 9, in which the resilient members are conductive and are themselves connected to a source of electricity, thus constituting electrical links between said contactors and said source of electricity.

11. Apparatus for removing retentive thermoplastic insulation from wires comprising a pair of rotatable wire brushes in contact one with the other between which the wire is adapted to be passed and by which the insulation is adapted to be physically removed, contactors electrically connected to a source of electricity and bearable against the periphery of said brushes, a frame to which said contactors are physically connected, and tension controlling elements on said frame active on said contactors to vary the force of engagement between said contactors and said brushes.

12. Apparatus for removing retentive thermoplastic insulation from wires comprising a pair of rotatable wire brushes in contact one with the other between which the wire is adapted to be passed and by which the insulation is adapted to be physically removed, contactors electrically connected to a source of electricity and bearable against the periphery of said brushes, a frame to which said contactors are physically connected, a guard on said frame covering a portion of the periphery of said brushes on the wire insertion side of said apparatus, said guard including a gap constituting a wire insertion guide opening, said guard being electrically insulated from said contactors so that wires inserted through said guide opening and touching said guard will not be electrically affected by virtue of said touching.

13. Apparatus for removing retentive thermoplastic insulation from wires comprising a rotatable abrasive brush over which the wire is adapted to be passed and by which the insulation is adapted to be physically removed, and a heating element for said abrasive brush effective to raise the temperature of said abrasive brush sufficiently to soften the insulation on the wire.

14. In the apparatus of claim 13, a wire-engaging member positioned adjacent said brush for pressing the wire into contact therewith.

15. Apparatus for removing retentive thermoplastic insulation from wires comprising a rotatable wire brush over which the wire is adapted to be passed and by which the insulation is adapted to be physically removed, a contactor electrically connected to said brush and to one side of a source of electricity, a wire-engaging member positioned adjacent said brush for pushing the wire into contact therewith, and an electrical connection between said member and the other side of said source of electricity, whereby a current is passed through and between said brush and said member, thereby raising the temperature of said brush sufficiently to soften the insulation on the wire.

16. Apparatus for removing retentive thermoplastic insulation from wires comprising a rotatable abrasive brush including electrically conductive bristles, said bristles being adapted to engage the insulation on a wire to facilitate removal of the same therefrom when said wire is passed over said brush, and electrical connections between said bristles and a source of electric power for causing an electric current to pass through said bristles, the temperature thereby being raised sufficiently to soften the insulation on the wire.

17. In the apparatus of claim 16, a wire-engaging member positioned adjacent said brush for pressing the wire into contact therewith.

18. The apparatus of claim 17, in which said member makes contact with said brush and is connected to one side of the source of electricity, and in which said brush is connected to the other side of said source, whereby a current is passed through and between the bristles and said member, thereby raising the temperature of said bristles sufficiently to soften the insulation on the wire.

19. Apparatus for removing retentive thermoplastic insulation from wires comprising a pair of rotatable wire brushes including electrically conductive bristles between which the wire is adapted to be passed and by which the insulation is adapted to be physically removed, and coils electro-inductively coupled to said brushes and connected to a source of alternating current for causing an electric current to pass through said bristles, the temperature of said bristles thereby being raised sufficiently to soften the insulation on the wire.

20. Apparatus for removing retentive thermoplastic insulation from wires comprising a rotatable wire brush including electrically conductive bristles over which the wire is adapted to be passed and by which the insulation is adapted to be physically removed, a coil electro-inductively coupled to said brush for causing an electric current to pass through the bristles in said brush, the temperature of said bristles being raised thereby sufficiently to soften the insulation on the wire, and a wire-engaging member positioned adjacent said brush for pressing the wire into contact therewith.

ROYAL F. SICKLES.

REFERENCES CITED

The following references are of record in the file of this patent:

UNITED STATES PATENTS

| Number | Name | Date |
|---|---|---|
| 453,162 | Ries | May 26, 1891 |
| 1,460,137 | Myers | June 26, 1923 |
| 1,526,063 | Griffin et al. | Feb. 10, 1925 |
| 2,192,056 | Watts | Feb. 27, 1940 |
| 2,214,760 | Brown | Sept. 17, 1940 |
| 2,250,602 | Pierce | July 29, 1941 |
| 2,315,121 | King | Mar. 30, 1943 |
| 2,396,594 | Moore | Mar. 12, 1946 |